United States Patent [19]

Creemers et al.

[11] 4,097,659

[45] Jun. 27, 1978

[54] PROCESS OF POLYMERIZING α-OLEFINS IN THE LIQUID PHASE

[75] Inventors: Henricus M. J. C. Creemers, Geleen; Renier J. L. Graff, Beek(L); Hendrinus M. Verschoor, Geleen, all of Netherlands

[73] Assignee: Stamicarbon, N.V., Geleen, Netherlands

[21] Appl. No.: 677,063

[22] Filed: Apr. 15, 1976

Related U.S. Application Data

[63] Continuation of Ser. No. 463,432, Apr. 23, 1974, abandoned, which is a continuation of Ser. No. 232,522, Mar. 7, 1972, abandoned.

[30] Foreign Application Priority Data

Mar. 11, 1971 Netherlands .................. 7103232

[51] Int. Cl.$^2$ ..................... C08F 4/66; C08F 10/00
[52] U.S. Cl. ..................... 526/151; 252/429 C; 526/153; 526/159; 526/169; 526/169.2; 526/348; 526/348.6; 526/351; 526/352
[58] Field of Search ............. 526/151, 153, 159, 463, 526/432, 232, 522, 169

[56] References Cited

U.S. PATENT DOCUMENTS

| 2,954,367 | 9/1960 | Vandenbey | 526/153 |
|---|---|---|---|
| 3,068,216 | 12/1962 | de Vries et al. | 526/159 |
| 3,118,865 | 1/1964 | Brun et al. | 526/153 |
| 3,737,393 | 6/1973 | de Vries | 526/151 |

FOREIGN PATENT DOCUMENTS

| 6,908,446 | 12/1969 | Netherlands. |
| 909,461 | 10/1962 | United Kingdom. |
| 1,139,450 | 1/1969 | United Kingdom. |

OTHER PUBLICATIONS

Coates et al., Organometallic Compounds, vol. 1, 3rd Ed., Methuen & Co. Ltd., London (1967), pp. 76–103.

*Primary Examiner*—Edward J. Smith
*Attorney, Agent, or Firm*—Cushman, Darby & Cushman

[57] ABSTRACT

A process for polymerizing α-olefins in the liquid phase is disclosed, wherein the olefins are polymerized in the presence of a catalyst prepared by first reacting as aluminum-halogen compound with an organomagnesium compound and thereafter reacting the resulting reaction mixture with a transition metal compound and then activating the resulting catalyst system with an organo-aluminum compound. The homopolymers and copolymers of α-olefins produced by this process find use in the normal applications of such polymers.

26 Claims, No Drawings

PROCESS OF POLYMERIZING α-OLEFINS IN THE LIQUID PHASE

This is a continuation, of application Ser. No. 463,432, filed Apr. 23, 1974, now abandoned which in turn is a continuation of Ser. No. 232,522, filed Mar. 7, 1972 (now abandoned).

BACKGROUND OF THE INVENTION

British Pat. No. 1,251,177 describes a process for polymerizing olefins at temperatures in excess of 110° C in the presence of a catalyst system obtained by reacting a transition metal compound with an organo-aluminum compound and an organo-magnesium compound. Polymerization is conducted at elevated temperatures to obtain a solution of the polymer in the reaction solvent. The catalyst components are added, one after the other or simultaneously, to the reaction solvent which is saturated with monomer, and which is heated at a temperature above 110° C.

It is known that the order of addition of catalyst components may exert extremely significant influence on the ultimate properties on the catalyst system, particularly the catalyst activity. For instance, U.S. Pat. No. 3,392,159 discloses that when adding an organo-magnesium compound to a titanium compound, catalysts are obtained whose activities are higher, by several degrees of magnitude, than those of catalyst systems prepared by adding the titanium compound to the organo-magnesium compound.

SUMMARY OF THE INVENTION

The process of the present invention is directed to the polymerization of α-olefins in the presence of a Ziegler-type catalyst, resulting in very high polymer yields. The catalyst is prepared by reacting an aluminum-halogen compound of the formula $$R_mAlX_{3-m}$$

with an organo-magnesium compound of the formula $$MgR'_2$$

thereafter mixing the resulting reaction product with a transition metal compound and thereafter activating the resulting catalyst system with an organo-aluminum compound. The molar ratio of halogen atoms in the said aluminum-halogen compound to magnesium atoms is at least 0.01.

DESCRIPTION OF THE INVENTION

In the process of this invention, the polymerization of α-olefins is conducted in the liquid phase in the presence of a catalyst prepared by first reacting an aluminum-halogen compound of the formula $$R_mAlX_{3-m}$$

wherein each R independently represents a hydrocarbyl group of 1 - 30 carbon atoms selected from the group consisting of alkyl, aryl, cycloalkyl, aralkyl, alkaryl, alkenyl and alkadienyl, X represents halogen and m is a value smaller than 3 and preferably smaller than 2.5, with an organo-magnesium compound of the formula $$MgR'_2$$

wherein each R' is independently a hydrocarbyl group having 1 - 30 carbon atoms selected from the group consisting of alkyl, aryl, cycloalkyl, aralkyl, alkaryl and alkenyl, wherein the molar ratio of X:magnesium is at least 0.01. Next, the resulting reaction product is mixed with a transition metal compound of a metal of Groups IV-B, V-B and VI-B of the Mendeleef Periodic Table which is substantially in the state of maximum valency, with reduction of the transition metal compound. Finally, the resulting reduced catalyst system is activated by addition of an organo-aluminum compound at least during the polymerization. The organo-aluminum compound is an aluminum-trialkyl, alkyl-aluminum halide, alkyl-aluminum hydride or a corresponding compound wherein one or more alkyl radicals are replaced by alkenyl radicals, the alkyl and alkenyl radicals having from 1 - 20 carbon atoms.

The aluminum-halogen compound of the formula $$R_mAlX_{3-m}$$

may have 1, 2 or 3 halogen atoms attached to the aluminum compound, and it is unnecessary for all of the halogen atoms to be the same. The halogen atoms are preferably bromides or chlorides, more preferably chlorides. The hydrocarbyl groups represented by R may be the same or different. Preferably, R represents alkyl groups, especially alkyl groups with 1–4 carbon atoms, the most preferred groups being ethyl or isobutyl groups. Aluminumtrichloride or aluminumtribromide may be used as such, as well as organo-aluminum halogen compounds such as monoethyl aluminumdichloride, sesquiethyl aluminum chloride, diethyl aluminum chloride and, of course, the corresponding compounds with other alkyl, especially isobutyl, or other hydrocarbyl groups, such as phenyl aluminum dibromide, dicyclohexyl aluminum chloride, dibenzyl aluminum monochloride, phenethyl aluminum dichloride, butadienyl aluminum dichloride, tolyl aluminum dichloride, diallyl aluminum bromide and the like. Also aluminum isoprenyl compounds may be used. Mixtures of various aluminum compounds may be used, provided the average composition satisfies the above formula. In other words, trialkyl aluminum compounds may even be used, provided the average composition falls within the scope of the aforesaid formula.

The organo-magnesium compounds used in the process of the present invention are compounds containing at least one hydrocarbyl group directly bound to magnesium by a carbon-magnesium bond. Preferably, the organo-magnesium compound contains 2 carbon-magnesium bonds and the two groups so linked to the magnesium atom may be the same or different. Examples of magnesium compounds of the formula $$MgR'_2$$

which can be used in the process of this invention are diethylmagnesium, dipropylmagnesium, diisopropylmagnesium, dibutylmagnesium, diisobutylmagnesium, didecylmagnesium, didodecylmagnesium, ethylbutylmagnesium, isopropyldecylmagnesium, diallylmagnesium, divinylmagnesium and the like, as well as compounds containing cycloalkyl groups such as cyclopentyl or cyclohexyl, such as dicyclohexylmagnesium, ethylcyclohexylmagnesium, and the like. It is preferred that the cycloalkyl groups have 3-12 carbon atoms, more preferably 5 or 6 carbon atoms. Of the aromatic magnesium compounds, diphenylmagnesium is particularly preferred although other compounds may be used, including ditolylmagnesium, dixylylmagnesium, diphenethylmagnesium, dibenzylmagnesium and compounds containing two or more condensed or uncondensed aromatic nuclei. One of the dihydrocarbyl groups of the dihydrocarbylmagnesium compounds may be wholly or partly replaced by a halogen atom or an oxyhydrocarbylgroup, with 1–30 carbon atoms. It is most preferred that the organo-magnesium compound be a dialkylmagnesium compound having 1–4 carbon atoms per alkyl group, especially dibutylmagnesium.

The organo-magnesium compounds may be conveniently prepared by known methods such as, for instance by starting from Grignard compounds, using, e.g. the procedure described in Organometallic Compounds, Vol. 1, G. E. Coates, M. L. H. Green and K. Wade; Organometallverbindungen, F. Runge. Such Grignard compounds are generally prepared by reacting magnesium with organic halides in etheric solutions, but it is also possible to carry out this reaction in a hydrocarbon medium in the absence of ethers. The presence of ethers in the preparation of the Grignard compounds is undesired in the preparation of magnesium compounds for use in the process of this invention, as less active catalyst systems will be obtained. The ethers form complexes with the magnesium and cannot be completely removed, even on heating the Grignard compounds in a vacuum. Therefore, it is particularly preferred to use solutions of organo-magnesium compounds in inert solvents and in the absence of ether compounds. Such solutions can be prepared according to the process disclosed in the copending application of Menno de Vries, Ser. No. 43,238, filed on June 3, 1970, now U.S. Pat. No. 3,737,393 the disclosure of which is hereby incorporated by reference. According to the process of this copending application, solutions of organo-magnesium compounds in inert solvents are obtained. Such organo-magnesium compounds include an $MgR'_2$ compound which is solubilized in an ether-free inert hydrocarbon solvent by treating it with an effective amount of $R''_m AlX'_n$ sufficient to cause dissolution of the $MgR'_2$, wherein $m$ represents 1, 2 or 3, $n$ represents 0, 1 or 2, and $R''$ is alkyl, cycloalkyl, arakyl, aryl or alkaryl of 1 to 25 carbon atoms, and wherein $X'$ is halogen or an alkoxy radical of 1 to 25 carbon atoms. The diorganomagnesium compounds by themselves are only slightly soluble or even insoluble, but the solubility of these compounds is considerably increased by the addition of small quantities of organo-aluminum compounds. Such solutions of solubilized organo-magnesium compounds are used to prepare the catalyst system of the process of the present invention. These solutions are mixed with an aluminum compound having the formula $$R_m AlX_{3-m}$$

Although many of these aluminum compounds are liquids, it is generally preferred to use solutions of the aluminum compounds in inert solvents in order to obtain a reaction product which can be easily handled and easily stirred.

The transition metal compound is a halide, an alkoxide or mixtures thereof, preferably a chloride, of a metal of groups IV-B, V-B and VI-B of the Periodic Table. Titanium compounds are decidedly preferred. It is preferred that the transition metal halides be chlorides or bromides. The transition metal compound should be substantially in the state of maximum valency, although minor amounts of such compounds in a state of less than maximum valency may be present. For instance, when tetravalent titanium compounds are used, minor quantities of trivalent titanium compounds may be present. Any halide or alkoxide or mixed compound which may be used as such may also be used in admixture with others. Titanium iodide, which is generally not used alone, may be present in minor quantities, as the presence of titanium iodide in certain cases has appeared to exert a favorable influence on the properties of the resulting polymer. In addition to or in admixture with titanium compounds, compounds of other transition metals such as, for instance, vanadium, molybdenum, zirconium or chromium, including $VCl_4$, $VOCl_3$, dialkoxy vanadium dichlorides, $MoCl_5$, $ZrCl_4$ and chromium acetylacetonate may also be used, with the vanadium compounds being preferred. The alkoxide group will generally contain from 1 – 20 carbon atoms. Further examples of suitable transition metal compounds include dibutoxy titanium dichloride, triethoxy vanadium chloride, tetrabutoxy titanium and diethoxy vanadium dichloride.

The amounts of the aluminum compounds and the magnesium compounds should be such that the molar ratio of X:Mg is at least 0.01. This X:Mg molar ratio may be substantially larger but there is generally no advantage in using a ratio of 100 or more. Preferably, the X:Mg molar ratio is between 0.2 and 10.

It has been established that a reaction takes place between the aluminum and the magnesium compounds by means of so-called microwave titrations (the method is described by E. H. Adema and J. Schrama in Anal. Chem. 37 (1965) 225) wherein the organo-aluminum compound is titrated with dibutylmagnesium solutions. The reaction mechanism, however, is not clear. There appear to be different equivalence points, at halogen to magnesium molar ratios of 1 and 3 and most likely also at a halogen to magnesium ratio of 2. At halogen to magnesium molar ratio of about 2, the titration curves have a particularly irregular pattern, while strong deviations occur on the lines obtained by extrapolation of the titration curves at larger or smaller values of the halogen to magnesium molar ratios.

Generally a precipitate forms during the reaction between the aluminum compound and the magnesium compound. The reaction mixture should be stirred until the conversion is complete, whereupon the reaction mixture is mixed with the transition metal compound, such as a tetravalent titanium compound, e.g., titanium tetrachloride. Liquid transition metal compounds, such as titanium tetrachloride, may be added directly to the reaction mixture, but they may also be first diluted with an inert solvent. The molar ratio of magnesium + aluminum:transition metal may vary within wide limits. There is no upper limit to this ratio but there are generally no technical advantages in using a large excess of magnesium plus aluminum, and such large excesses are decidedly disadvantageous from an economical viewpoint. Generally, therefore, the molar ratio of magnesium + aluminum:transition metal will be no more than 100. Preferably, the ratio is between 0.1 and 10, more preferably between 0.5 and 5.

The organo-aluminum activator is a trialkyl aluminum, an alkyl aluminum halide or an alkyl aluminum hydride and corresponding compounds wherein one or more alkyl radicals are replaced by alkenyl or alkadienyl radicals, although the organo-aluminum compound will always contain at least one alkyl radical. The alkyl radicals, the alkenyl and the alkadienyl radicals contain from 1-20 carbon atoms. Where the aluminum atom carries more than one alkyl group, the alkyl groups may be the same or different.

Examples of organo-aluminum activator compounds include trimethylaluminum, triethylaluminum, tributylaluminum, tridecylaluminum, tripalmitylaluminum, monohexyldibutylaluminum, dibutylaluminumchloride, monoethylaluminumdibromide, dioctylaluminumhydride, monopropylaluminumdihydride, dimethylmonobutoxyaluminum, monodecylpropoxyaluminumchloride, monobutylmonobutoxyaluminumhydride, aluminum isoprenyl compounds in particular triisoprenylaluminum.

Various methods of catalyst preparation are within the scope of the present invention. For instance the reaction of the aluminum compound with the magnesium compound is conveniently at ambient conditions. Temperatures of e.g. $-20°$ to $60°$ C., may be used if desired. The transition metal compound is generally added slowly, preferably dropwise, to the reaction product of the aluminum compound and the magnesium compound. This addition may take place at ambient temperatures or higher or lower temperatures, ranging up to about $100°$ C. At temperatures of over about $60°$ C, however, the catalysts obtained are only slightly stereospecific and, while suitable for the polymerization of ethylene, are considered less desirable for the polymerization of olefins having three or more carbon atoms. It is therefore in many cases preferred to use catalysts prepared by mixing the reaction product of the aluminum compound and the magnesium compound with the transition metal compound at temperatures below ambient, and more preferably at temperatures below $0°$ C. The use of such low temperatures for the transition metal reduction will, on the one hand, increase the stereospecificity and, on the other hand, it appears that catalyst particles having a more regular shape are then obtained, which results in the ultimate polymer also consisting of particles of a more regular shape. This approach often appears to increase the bulk density of the polymer, which is an extremely desirable effect in many instances. This low temperature transition metal reduction method of catalyst preparation may therefore also yield advantages in the polymerization of ethylene. The transition metal reduction is generally under ambient pressures, although higher or lower pressures may be used if desired.

When the transition metal compound is mixed with and reduced by the reaction product of the aluminum compound and the magnesium compound, a catalyst suspension is obtained. The solid portion of the catalyst suspension may be separated from the liquid, and excess reaction products remain dissolved therein. The isolated solid product can be washed with fresh dispersing agent to remove additional reaction products therefrom. The untreated catalyst suspension as well as the isolated solid reduced titanium compounds, which may or may not have been washed, may be heated to temperatures above $150°$ C, preferably above $200°$ C, and up to about $350°$ C to further increase the stereospecificity of the catalyst. Preferably, this heating step is at a temperature of $210°$ to $275°$ C.

The process of the present invention may be used to polymerize ethylene, propylene, butene, pentene, hexene, 4-methyl-pentene and other α-olefins having 3-20 carbon atoms as well as mixtures thereof to form corresponding homopolymers and copolymers. The process can also be used in the copolymerization of one or more of the above α-olefins with dienes having 4-10 carbon atoms, such as, for instance, butadiene, pentadiene and isoprene. Generally, the aforesaid diene compounds will be present in amounts of from 0 to 10 mole percent, based on the total amount of monomers present. Preferably, the α-olefin has 2-4 carbon atoms.

The polymerization of the α-olefins is conducted generally by charging a reactor with an inert liquid poliymerization medium generally subsequently charging the activator, saturating the polymerization medium, with the monomer or monomers and charging then the catalyst. Liquid monomers may also be used as polymerization medium. If the monomer is a liquid under the polymerization conditions it may also be diluted with an inert dispersing agent. The amount of catalyst will generally be such that the titanium concentration is 0.001 to 10 mmoles per liter, preferably 0.01 to 1 mmole per liter, based on the volume of liquid (monomer plus inert polymerization medium if the latter is used) in the reactor. The activator may also be added to the catalyst system prior to charging same to the reactor. As mentioned above, the monomer may be a mixture of α-olefins and the monomer may also contain polyunsaturated monomers. During the course of the polymerization, additional amounts of organo-aluminum activators may be added, either continuously or intermittently. Alternatively, it is possible to omit addition of the organo-aluminum activator prior to the polymerization, and activate only during the polymerization, or vice versa. The polymerization is conducted at a temperature below the melting point of the polymer so that a suspension of the polymer is obtained. Generally, the polymerization temperature will be less than $100°$ C, for the case of polyethylene, and generally the temperature will be at least $20°$ C, as lower temperatures have a substantial adverse effect upon the catalyst activity.

As a dispersant agent or reaction medium, both in the preparation of the catalyst and in the polymerization itself, any liquid may be used which is inert to the catalyst system and does not adversely affect the polymerization reaction, including saturated aliphatic hydrocarbons such as butane, pentane, hexane, heptane, pentamethylheptane and higher alkanes, petroleum oil fractions, aromatic hydrocarbons such as benzene, and toluene and hydrogenated aliphatic or aromatic hydrocarbons such as tetrachloroethylene and trichlorobenzene. The polymerization may also be conducted in liquid monomer. It will therefore be appreciated that when the term "liquid polymerization medium" is used herein, there is meant the inert liquids described above and liquid monomers.

The polymerization may be conducted at atmospheric pressure or at elevated pressures of up to about 2000 kg/cm$^2$. Preferably the polymerization is conducted at 1-100 kg/cm$^2$. The polymerization process may be discontinuous, semicontinuous or continuous. The polymerization may also be carried out in two or more steps either parallel or in series. If desired polymerization conditions as e.g. catalyst composition, temperature, residence time, pressure, hydrogen concentration may be different in different steps. So one can for instance produce polymers having a broad molecular weight distribution, by polymerizing in one step under such conditions of for instance pressure, temperature, hydrogen concentration, that a polymer having a high molecular weight is obtained, and polymerizing in another step under such conditions that a polymer having a lower molecular weight is produced. By conducting the polymerization under pressure, the polymer yields are generally found increased, which contributes to the production of a polymer having very low contents of catalyst residues.

In the polymerization process, various modifications conventional in the art may be used. For instance, the molecular weight of the polymer may be controlled by the addition of hydrogen or other modifying agents normally used for this purpose.

The polymer suspension obtained by the process of this invention may be worked up using conventional methods. Generally, the catalyst is first deactivated, conveniently by the addition of a lower alkanol. Thereafter catalyst residues can be extracted with suitable solvents, but due to the high activities of the catalyst systems used in the process of this invention the amount of catalyst residues in the polymer, especially the titanium content of the polymer, is generally so small that as a rule such solvent extraction or other washing out need no longer be considered necessary, which is a particular advantage of the present process.

EXAMPLES OF THE INVENTION

EXAMPLE 1

(a) Catalyst preparation 8.2 ml of pure diethyl aluminum chloride and 70 ml of pentamethylheptane were mixed, at a temperature of 20° C, in a three-necked flask provided with a stirrer, a reflux cooler and a dropping funnel, with the flask maintained under an atmosphere of dry nitrogen. Then 47 ml of a 0.35 molar dibutylmagnesium solution in pentamethylheptane at 20° C were added to the contents of the flask, while maintaining the temperature at 20° C whereupon a fine precipitate was formed.

The resulting mixture was then cooled to a temperature of −60° C and then 19.1 ml of titanium tetrachloride in 20 ml of pentamethylheptane were slowly added through the dropping funnel, while maintaining the temperature of the reactor contents at −60° C. The color of the flask contents turned to brown. The reaction mixture was stirred over night while allowed to slowly reach room temperature.

The contents of the reaction flask were then heated at a temperature of 210° C for 15 minutes, during which time the color of the reaction mixture changed from brown to violet. The titanium concentration of the reaction mixture was 0.96 moles per liter.

(b) Propylene polymerization

A 3-liter reactor was successively charged with 1.8 liters of naphtha having a boiling range of 62°–72° C and then with an amount of the catalyst suspension prepared according to Example 1(a) above such that the concentration of titanium in the resulting mixture was 1.67 mmoles of titanium per liter. Then, an amount of diethyl aluminum chloride at a temperature of 20° C was added such that the concentration of aluminum in the reactor was 3.33 mmoles per liter.

The temperature of the reactor contents was adjusted at 65° C, and propylene was introduced into the reactor at a partial pressure of three atmospheres absolute. After one hour of polymerization, a yield of 54 g of polypropylene (93% insoluble in the naphtha) was obtained.

EXAMPLE 2

(a) Catalyst preparation

Using the procedure described above for Example 1(a), 13.7 ml of monoethyl aluminum dichloride were mixed with 20 ml of pentamethylheptane at 20° C, and then 100 ml of 0.33 molar dibutyl magnesium solution in pentamethylheptane were added to the mixture where upon a fine precipitate was formed. The resulting mixture was cooled to −5° C and then 11 ml of titanium tetrachloride in 21 ml of pentamethylheptane were added dropwise to the flask contents. The stirred flask contents were allowed to reach room temperature overnight, and a brown suspension was obtained having a titanium concentration of 0.6 moles per liter.

(b) Ethylene polymerization

A 3-liter reactor was successively charged with 1.8 liters of naphtha having a boiling range of 62°–72° C and with 3.6 mmole of triisobutylaluminum giving a concentration of 2 mmoles of triisobutylaluminum per liter. The reactor contents was heated to 85° C and saturated with ethylene. Subsequently such an amount of the catalyst suspension prepared in Example 2(a) above was added that the titanium concentration in the reactor contents was 0.3 mmole of Ti per liter. Ethylene was continuously charged into the reactor up to a total pressure in the reactor of 3 atmosphere gauge and adding such amounts of hydrogen to the ethylene feed that in the reactor a hydrogen concentration calculated on hydrogen and ethylene of 40% was maintained. After one hour of polymerization the polyethylene yield was 795 g of polyethylene per mmole of titanium per hour per atmosphere ethylene pressure.

For comparative purposes ethylene was polymerized as described above but using a catalyst composition prepared according to Example 2(a) above, wherein the 13.7 ml monoethyl aluminum dichloride had been substituted for an equivalent amount viz. 17.4 ml triethylaluminum and the mixture of aluminum component and magnesium component was cooled to −60° C instead of to −5° C.

The yield was only 87 g of polyethylene per mmole of titanium per hour per atmosphere ethylene pressure.

For comparative purposes the method of Example 2(a) above was modified in that way, that the catalyst components monoethylaluminum dichloride, dibutylmagnesium and titaniumtetrachloride were charged simultaneously (through three dropping funnels) in a reactor which had been cooled to −5° C and was maintained at −5° C during the charging of the components.

The so prepared catalyst was used for polymerizing ethylene according to the method described above. The yield was 360 g of polyethylene per mmole of titanium per hour per atmosphere ethylene pressure.

EXAMPLE 3

(a) Catalyst preparation

A portion of the catalyst suspension prepared in Example 2(a) was heated at 210° C for 10 minutes, whereupon the color changed from brown to violet. The catalyst suspension was filtered and then washed twice with pentamethyl heptane. The titanium concentration of the resulting suspension was 0.6 mmoles per liter.

(b) Butene-1 polymerization 400 ml of cyclohexane in a glass reactor were saturated with butene-1, and thereafter an amount of the catalyst suspension prepared according to Example 3(a), containing 0.34 mmole of titanium, and then 2 mmoles of diethyl aluminum chloride were added successively. Butene-1 was polymerized under atmospheric pressure at a temperature of 50° C. The polymerization was terminated after 1 hour and the resulting polybutene was recovered from the solution. 4 g of polybutene-1 were obtained, corresponding to a yield of 10 g of polybutene-1 per mmole of titanium per hour per atmosphere of butene pressure. The polybutene-1 content of isotactic product, determined by extraction with ether, was 98%.

EXAMPLE 4

(a) Catalyst preparation 26.4 ml of a 2 molar solution of monethyl aluminum-dichloride in naphtha having a boiling range of 62°-72° C were charged to a flask provided with a stirrer and a dropping funnel and maintained under an atmosphere of pure nitrogen. 44 ml of a 0.3 molar solution of dibutyl magnesium in naphtha having the above boiling range were slowly added at 40° C with stirring whereupon the formation of a fine precipitate could be observed. After the addition of the dibutylmagnesium was completed, the stirring was continued for 20 more minutes with the flask contents maintained at 40° C. Then 2.5 ml of a 4 molar solution of titanium tetrachloride in naphtha having the above boiling range were added dropwise to the flask contents, and after the titanium tetrachloride addition was completed additional naphtha having a boiling range of 62°-72° C. was added until the total flask contents amounted to 100 ml. The flask contents were continuously maintained at 40° C and, after the addition of the titanium tetrachloride and the additional naphtha was completed, stirring at 40° C was continued for an additional period of 45 minutes. The resulting catalyst suspension contained 528 mmoles per liter of monoethyl aluminum dichloride, 132 mmoles per liter of dibutyl magnesium, 100 mmoles per liter of titanium tetrachloride, or reaction products thereof.

(b) Ethylene polymerization

The polymerization of ethylene was conducted using the method described in Example 2(b) above, except the catalyst composition used was that produced in Example 4(a) above, again in quantities such that the titanium concentration was 0.3 mmoles per liter.

After 1 hour of polymerization, the yield was 1900 g of polyethylene per mmole of titanium per hour per atmosphere of ethylene pressure.

EXAMPLE 5

(a) Catalyst preparation

Using the procedure described in Example 4(a) above, a catalyst suspension was prepared, except that only one-fifth of the amount of titanium tetrachloride used in the proceeding example was used. Therefore the concentration of titanium in the catalyst suspension was 20 mmole per liter.

(b) Ethylene polymerization

The process of Example 2(b) was repeated, except that the catalyst suspension obtained in Example 5(a) above was used, in such an amount that the titanium concentration was 0.06 mmole of titanium per liter.

After one hour of polymerization the yield was 11,300 g of polyethylene per mmole of titanium per hour per atmosphere of ethylene pressure.

EXAMPLE 6

(a) Catalyst preparation

The catalyst of this example was prepared using the method described in Example 4(a) above, except the aluminum compound was monoisobutyl aluminumdichloride, and the amount of dibutylmagnesium was doubled. The catalyst suspension contained 528 mmoles per liter of monoisobutyl aluminumdichloride, 264 mmole per liter of dibutyl magnesium, 100 mmoles per liter of titanium tetrachloride or reaction products thereof.

(b) Ethylene polymerization

Ethylene was polymerized using the catalyst suspension prepared in Example 6(a) above, in two different ways. First, the ethylene was polymerized using the method of Example 2(b), except that the catalyst was, as indicated above, that prepared in Example 6(a), and the catalyst was again activated with 2 mmoles per liter of triisobutyl aluminum. Using this activated catalyst, a yield of 1680 g of polyethylene per mmole of titanium per hour per atmosphere of ethylene pressure was obtained.

The second method of polymerizing ethylene was the same as the first method described above, except that the triisobutyl aluminum activator was omitted, otherwise the same reaction conditions were used. The yield of polymer was only 343 g of polyethylene per mmole of titanium per hour per atmosphere of ethylene pressure, and the resulting polyethylene had a much lower bulk density than that produced in the first method of this example.

EXAMPLE 7

(a) Catalyst preparation

The process described in Example 4(a) was repeated, but using a temperature of 25° C and using, as the aluminum-halogen compound, monoisobutyl aluminum dichloride. The resulting product contained 528 mmoles per liter of monoisobutyl aluminumchloride, 132 mmoles per liter of dibutyl magnesium, 100 mmoles per liter of titanium tetrachloride, or reaction products thereof.

(b) Ethylene polymerization

Ethylene was polymerized using the method of Example 2(b) above except the catalyst used was then prepared according to Example 7(a) above. The yield was 2000 g of polyethylene per mmole of titanium per hour per atmosphere of ethylene pressure.

EXAMPLE 8

Comparative Example (a) Catalyst preparation

A catalyst suspension was prepared according to the method described in Example 4(a), except the dibutyl magnesium was omitted. The resulting catalyst suspension contained 528 mmoles per liter of monoethylaluminumdichloride, 100 mmoles per liter of titanium tetrachloride, or reaction products thereof.

(b) Ethylene polymerization

Ethylene was polymerized by the process described in Example 2(b) above, with the addition of a triisobutylaluminum activator, except the catalyst suspension used was then prepared as in Example 8(a) above. The process yield was only 190 g of polyethylene per mmole of titanium per hour per atmosphere of ethylene pressure.

What is claimed is:

1. In a process for suspension polymerizing at least one α-olefin in the liquid phase at a temperature of about 20° to 100° C. in the presence of a catalytic amount of a Ziegler-type catalyst, the improvement comprising using a catalyst prepared by reacting
(1) a solution of an ether-free inert hydrocarbon solvent in which is dissolved at least one organomagnesium compound of the formula

wherein each R' is independently a hydrocarbyl group of 1 – 30 carbon atoms selected from the group consisting of alkyl, aryl, cycloalkyl, aralkyl, alkaryl and alkenyl,
wherein said MgR'$_2$ is solubilized in said ether-free inert hydrocarbon solvent by treating said MgR'$_2$ with an amount of R"$_m$AlX'$_n$ which is effective to cause the dissolution of said MgR'$_2$, m being an integer of 1 to 3 and n being an integer of 0 – 2, wherein R" is alkyl, cycloalkyl, aralkyl, aryl or alkaryl of 1 – 25 carbon atoms and X' is halogen or alkoxy of 1 – 25 carbon atoms;
with (2) at least one aluminum halogen compound of the formula

wherein each R independently represents a hydrocarbyl group of 1 – 30 carbon atoms selected from the group consisting of alkyl, aryl, cycloalkyl, aralkyl, alkaryl, alkenyl and alkadienyl, each X independently represents halogen, and m is a value of less than 3,
wherein the molar ratio of X:magnesium is at least 0.01,
to form a reaction product in the form of a precipitate,
and thereafter mixing the resulting reaction product with at least one transition metal compound of a metal of Groups IV-B, V-B and VI-B of the Periodic Table, which transition metal is substantially in the state of maximum valency, the said transition metal compound selected from the group consisting of halides, alkoxides of 1 – 20 carbon atoms, and mixtures thereof, to reduce said transition metal compound,
and thereafter activating the resulting reduced catalyst system with an activating amount of at least one organo-aluminum compound, said organo-aluminum compound selected from the group consisting of aluminum trialkyls, alkyl aluminum halides, alkyl aluminum hydrides and corresponding compounds wherein one or more alkyl radicals are replaced by alkenyl radicals or alkadienyl radicals, and mixtures thereof, said alkyl radicals and said alkenyl or alkadienyl radicals having 1 – 20 carbon atoms.

2. Process according to claim 1 wherein the molar ratio of aluminum-halogen compound aluminum atoms + magnesium atoms:transition metal atoms in said catalyst is less than 100.

3. Process according to claim 2 wherein said molar ratio of aluminum + magnesium:titanium is between 0.1 and 10.

4. Process according to claim 3 wherein said molar ratio of aluminum + magnesium:titanium is 0.5 – 5.

5. Process according to claim 2 wherein the molar ratio of X:magnesium is no more than 100.

6. Process according to claim 5 wherein said ratio of X:magnesium is 0.2–10.

7. Process according to claim 1 wherein X is chlorine or bromine.

8. Process according to claim 7 wherein X is chlorine.

9. Process according to claim 1 wherein R is an alkyl radical of 1 – 4 carbon atoms.

10. Process according to claim 9 wherein R is ethyl or isobutyl.

11. Process according to claim 1 wherein each R' is independently an alkyl group of 1 – 4 carbon atoms.

12. Process according to claim 1 wherein said organo magnesium compound is dibutyl magnesium.

13. A process according to claim 12, wherein said transition metal compound is TiCl$_4$.

14. Process as claimed in claim 1 wherein said transition metal compound is at least one titanium compound.

15. Process according to claim 14, wherein said titanium compound is a titanium tetrahalide.

16. Process according to claim 15 wherein said titanium tetrahalide is titanium tetrachloride.

17. Process according to claim 14 wherein the titanium concentration in the polymerization medium is 0.001 – 10 mmoles per liter.

18. Process according to claim 1 wherein the reaction product of said aluminum-halogen compound and said organo-magnesium compound is mixed with said transition metal compound at a temperature below 100° C.

19. Process according to claim 18 wherein said mixing is at a temperature below 0° C.

20. Process according to claim 1 wherein said catalyst is activated with at least one aluminum trialkyl.

21. Process according to claim 20, wherein said aluminum trialkyl is triethyl aluminum.

22. Process as claimed in claim 1 wherein the polymerization is conducted at a pressure of 1 – 100 kg/cm$^2$.

23. Process according to claim 1 wherein said α-olefin comprises at least one α-olefin having 2 – 20 carbon atoms and from 0 – 10 mole percent of at least one diene having 4 – 10 carbon atoms.

24. Process according to claim 23 wherein said α-olefin has 2 – 4 carbon atoms.

25. Process for suspension homo- or co-polymerizing ethylene according to claim 1 wherein the molar ratio of X:magnesium is between 0.01 – 100, the molar ratio of aluminum-halogen compound aluminum atoms + magnesium atoms:transition metal atoms is 0.1 – 100, X is chlorine or bromine, R and R' are each alkyl radicals of 1 – 4 carbon atoms, said transition metal compound is titanium tetrachloride, the reaction product of said aluminum-halogen compound and said organo-magnesium compound is mixed with said transition metal compound at a temperature below 0° C, and the organo-aluminum activator compound is an aluminum trialkyl.

26. Process according to claim 25, wherein the ratio of X:magnesium is 0.2 – 10, X is chlorine, each R is ethyl or isobutyl, each R' is dibutyl, the aluminum-halogen compound and organo-magnesium compound reaction product is mixed with the transition metal compound at a temperature below 0° C, and the organo-aluminum activator compound is triethyl aluminum.

* * * * *